United States Patent
Deallenbach

(10) Patent No.: US 7,344,359 B2
(45) Date of Patent: Mar. 18, 2008

(54) METHODS AND SYSTEMS FOR ASSEMBLING SHROUDED TURBINE BUCKET AND TANGENTIAL ENTRY DOVETAIL

(75) Inventor: Robert Edward Deallenbach, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 11/142,292

(22) Filed: Jun. 2, 2005

(65) Prior Publication Data

US 2006/0275124 A1    Dec. 7, 2006

(51) Int. Cl.
*F01D 5/30*    (2006.01)
(52) U.S. Cl. ............. 416/215; 416/218; 416/222
(58) Field of Classification Search ............ 416/219 R, 416/221, 222, 215, 218
See application file for complete search history.

(56) References Cited

U.S. PATENT DOCUMENTS

| 5,509,784 A | 4/1996 | Caruso et al. |
| 2006/0127221 A1* | 6/2006 | Yamashita et al. ........... 416/222 |

* cited by examiner

*Primary Examiner*—Edward K. Look
*Assistant Examiner*—Dwayne J White
(74) *Attorney, Agent, or Firm*—Nixon & Vanderhye, PC

(57) ABSTRACT

Rhombic shrouded tangential entry buckets are circumferentially applied to the rotor wheel rim of a turbine. A fixture is releasably secured to a lug on each bucket and includes a chamfered surface for engaging a complementary surface on the lug. Upon applying a tangential assembly force, the shroud and airfoil of adjacent buckets are pre-twisted in a rotational direction about a generally radial axis enabling dovetail faces to contact one another notwithstanding interference fit shroud contacting surfaces. The removal of the fixture from the lug enables the bias of the airfoil to rotate the shroud in an opposite direction into final assembly with the shroud edges of adjacent buckets in contact with one another and the dovetail faces thereof in contact with one another.

16 Claims, 6 Drawing Sheets

METHODS AND SYSTEMS FOR ASSEMBLING SHROUDED TURBINE BUCKET AND TANGENTIAL ENTRY DOVETAIL

BACKGROUND OF THE INVENTION

The present invention relates to methods and systems for assembling buckets having a shroud and a tangential entry dovetail onto the rim of a turbine wheel, particularly to assure complete accurate mechanical coupling between adjacent shrouds in final assembly.

Shrouded turbine buckets, e.g. for use in steam turbines, require the shroud edges to be in mechanical contact with one another, eliminating any gap between adjacent shrouds. The shrouds typically support application of tip seals to provide improved turbine thermal efficiency. High levels of mechanical reliability are also required under service conditions. A shroud having a predominantly rhombic (i.e., full rhombic or modified rhombi) configuration satisfies these design characteristics. Shrouds having a rhombic configuration, however, are not per se new or new in conjunction with buckets employing a tangential entry dovetail. Buckets having rhombic-shaped shrouds have been previously used in low, intermediate and high pressure turbine applications. Integrally shrouded buckets, however, become increasingly difficult to assemble as airfoil stiffness is increased, as airfoil aspect ratio (i.e., radial height/axial width) is reduced, or as higher pre-twist stresses are required. Problems associated with assembly of buckets having rhombic configured shrouds and tangential entry dovetails include; generating adequately high tangential forces needed to eliminate gaps between (i.e., to pack together) adjacent shrouds and dovetail faces, and to produce an adequate pre-twist of the bucket airfoils. The level of pre-twist must be sufficient to assure that the adjacent shrouds remain in contact, i.e. are mechanically coupled, during all normal phases of turbine operation. Tangential assembly forces required to adequately pack buckets together on a turbine wheel can become very high for buckets of the size employed in large steam turbine applications. Also, as the buckets are packed together, the dovetails undergo rotation, which in turn reduces the level of pre-twist applied to the bucket airfoils. Dovetail rotation must be limited to assure an adequate assembly. Further, the buckets in their packed configuration must be constrained from backing away from each other as additional buckets are installed on the wheel. The tendency to back away is associated with the forces developed at the shroud contact surfaces, and the orientation of these surfaces relative to the tangential direction. Accordingly, there is a need for an assembly method and system which will overcome the aforementioned problems associated with assembly of shrouded buckets on a turbine wheel; and which will in turn permit the buckets to meet all efficiency and reliability objectives.

BRIEF DESCRIPTION OF THE INVENTION

In a preferred embodiment of the present invention, a method of assembling a plurality of buckets on a rotor wheel wherein each bucket includes an airfoil terminating at opposite ends in a shroud and a dovetail, respectively, comprising the step of pre-twisting the shroud and airfoil of each bucket in a rotational direction about a generally radial axis in response to applying a tangential assembly force to interference fit shroud contacting surfaces thereby imparting a rotational bias to the airfoil enabling subsequent rotation of the shroud and airfoil into final assembly with the shroud edges of adjacent buckets in contact with one another and dovetail faces of adjacent buckets in contact with one another.

In a further preferred embodiment of the present invention, a method of assembling a plurality of buckets on a rotor wheel wherein each bucket includes an airfoil terminating at opposite ends in a shroud and a dovetail, respectively, comprising the steps of: providing a lug on the shroud of each bucket; releasably securing a fixture on each lug carried by the shroud of each bucket, the fixture and lug of respective adjacent buckets having generally complementary tapered surfaces at acute angles relative to the tangential direction; and wedging the fixture carried by the shroud of each bucket being installed against the tapered surface of the lug carried by the shroud of the adjacent bucket previously installed on the rotor rim to pre-twist the shroud and airfoil of the bucket.

In a further preferred embodiment of the present invention, a turbine wheel and bucket assembly comprising a plurality of buckets each including an airfoil, a shroud adjacent the tip of the airfoil and a dovetail adjacent a root of the airfoil; a lug carried by each shroud; a fixture releasably secured to each lug and having a projection extending in a tangential direction for overlying a portion of a lug of a previously assembled bucket onto the wheel, the adjacent shrouds having interference fit contacting surfaces; at least one of the lug and the fixture projection having a tapered surface in contact with a surface of another of the lug and fixture projection to pre-twist the shroud and airfoil being installed.

DETAILED DESCRIPTION OF THE INVENTION

Figure 1:
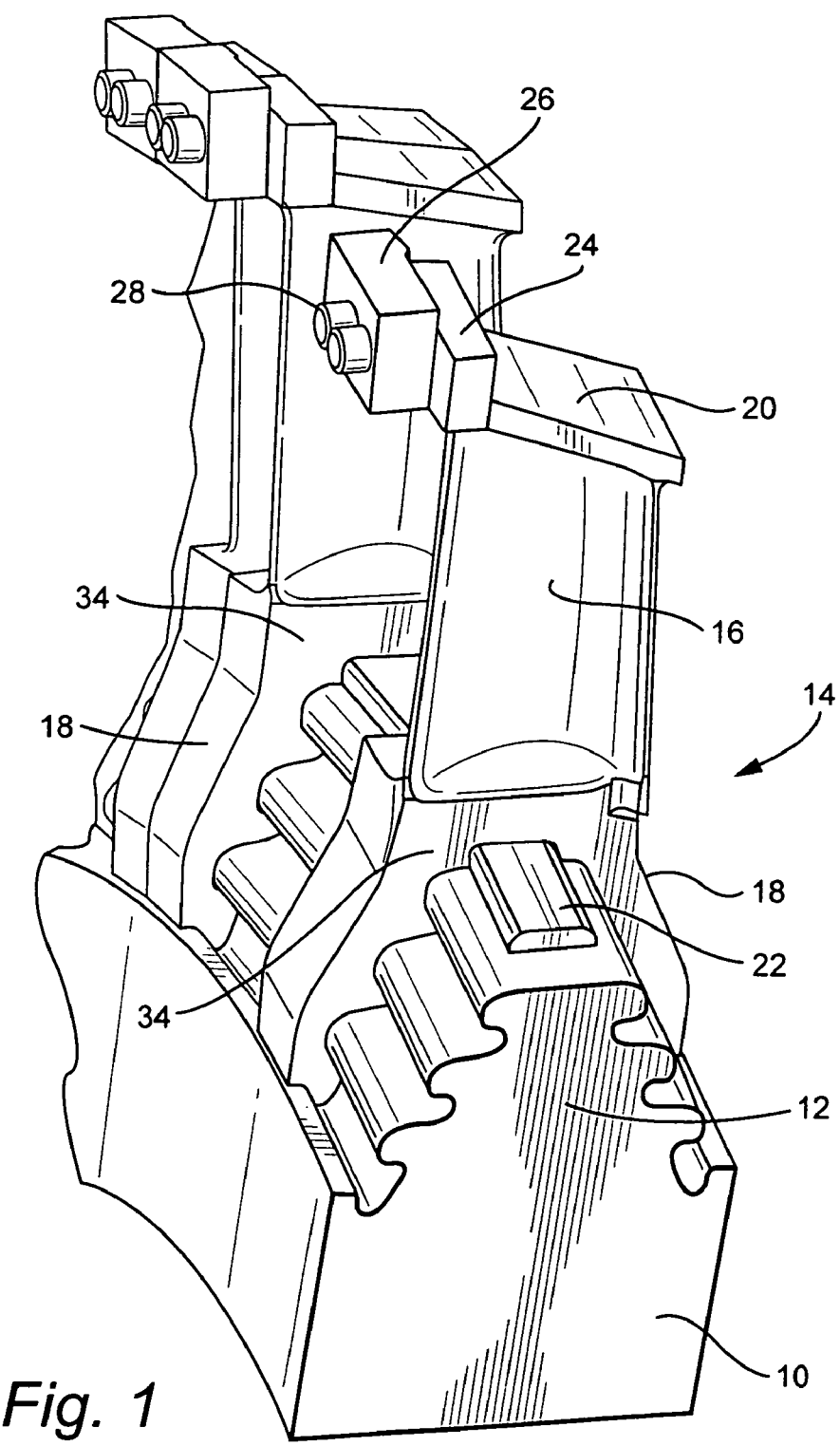
FIG. 1 is a fragmentary perspective view illustrating buckets with rhombic-shaped shrouds being installed on the rim of a turbine rotor wheel in accordance with a preferred embodiment of the present invention.

Referring now to the drawings, particularly to FIG. 1, there is illustrated a turbine rotor wheel 10 including a wheel rim 12 having a rib and groove configuration, i.e. a pine tree configuration along opposite axial sides thereof about the circumference of the wheel 10. Also illustrated in FIG. 1 are a plurality of buckets generally designated 14. Each bucket 14 includes an airfoil 16 having a dovetail 18 projecting from the root of the airfoil and a shroud 20 adjacent the tip of the airfoil. It will be appreciated that the dovetail 18 has a mating corresponding rib and groove arrangement, i.e., a pine tree configuration complementary to the pine tree configuration of the wheel dovetail 12. Thus, the buckets 14 constitute tangential entry buckets whereby the buckets are disposed in a radial slot, not shown, on the wheel 10 and slidably disposed about the turbine wheel with contact faces of the dovetail and contact edges of the shrouds in respective engagement with corresponding parts of adjacent buckets. Also illustrated in FIG. 1 is an anti-rotation key 22 which extends about the outer periphery of the dovetail 12 of the rotor wheel 10 and which engages in a corresponding slot at the base of the dovetail 18 to minimize or preclude rotation of the dovetail and hence bucket 14 during assembly and operation. A similar anti-rotation key is described and illustrated in U.S. Pat. No. 5,509,784 of common assignee herewith.

In FIG. 1, each of the buckets 14 is illustrated as including a lug 24 projecting radially outwardly from the forward edge of shroud 20. The lug 24 is preferably formed integrally with the shroud 20 and is in part removed from each bucket and shroud after final assembly. Also illustrated in FIG. 1 are fixtures 26 mounted on each of the respective lugs 24 and which fixtures 26 project axially forwardly. Each fixture 26 may be bolted to an associated lug 24 by bolts 28.

Figure 2:
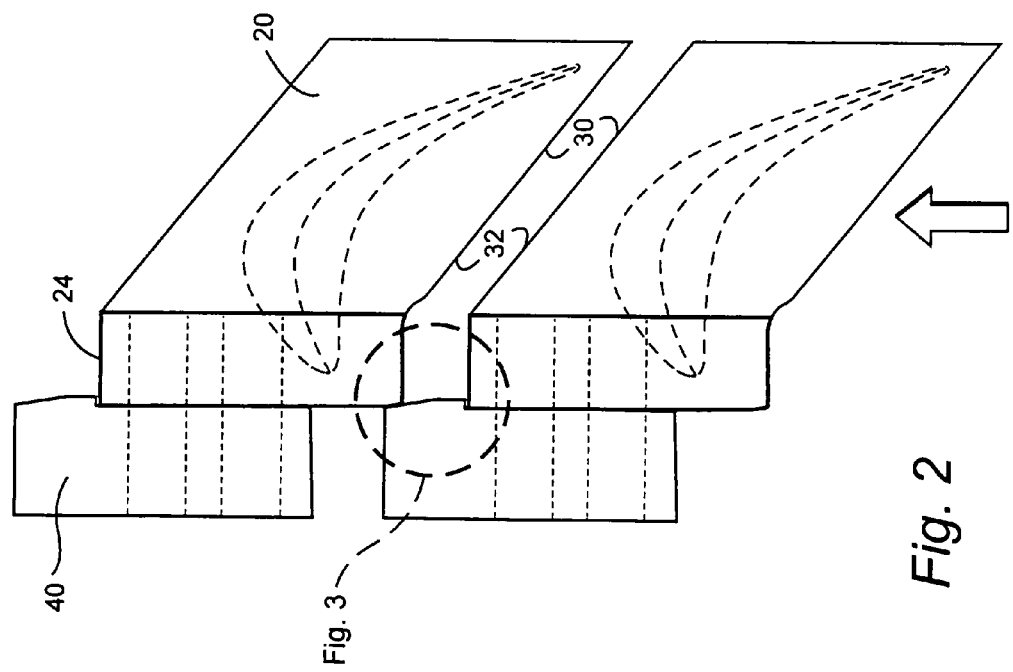
FIG. 2 is a plan view of a pair of buckets as viewed looking inwardly towards the radially outer faces of the shrouds in the course of assembly of the buckets onto the wheel.
Figure 4:
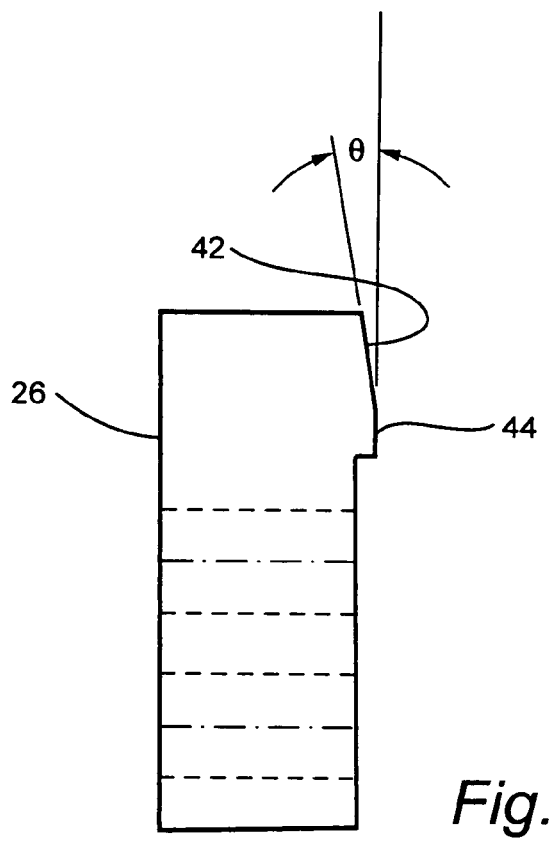
FIG. 4 is an enlarged view of a fixture for securement to the lug on the shroud.
Figure 7:
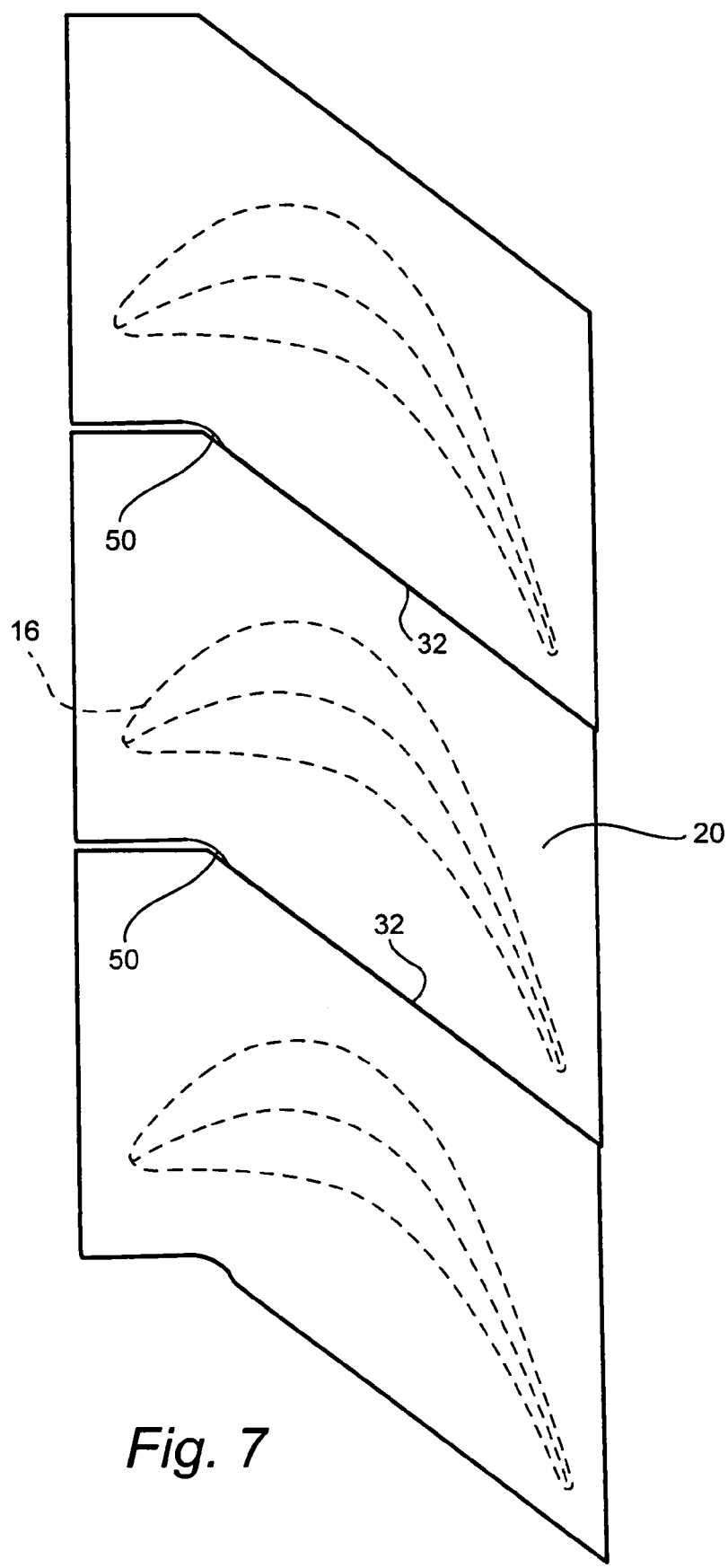
FIG. 7 is a view similar to FIG. 6 with the buckets in final assembly.

As best illustrated in FIG. 2, the shrouds 20 have a rhombic configuration. It will be appreciated that in final assembly, the angled margins or tangential edges 30 of the shrouds abut one another as illustrated in FIG. 7. However, those adjoining angled edges 30 which typically extend about 40 to 60° relative to the tangential axis or direction have an extant interference condition at their mating shroud contact surfaces 32 when the buckets are assembled to the turbine wheel and the adjacent dovetail faces 34 contact one another. That is, there is an excess amount of material on the contact edges 30 of the shrouds so that the shroud edges would theoretically overlap one another when the dovetail faces 34 of adjacent buckets 14 are in contact one with the other. Because of this shroud interference condition at the shroud contacting surfaces 32, the adjacent dovetail faces 34 cannot be brought into full flush contact with one another until a rotation or twisting of the shroud 20 occurs. By rotating the shroud about a bucket radial axis, a change in the shroud cover tangential pitch occurs which permits the bucket assembly to accommodate the shroud interference condition. That is, the excess amount of material forming the edges 30 of the adjacent shrouds is taken up by rotation of the shrouds about generally radial axes of the buckets to produce a twisting of the shrouds as well as an elastic pre-twist of the bucket airfoils. Because of the angle of the shroud edges 30, a twisting of the shroud reduces the tangential width of the shroud as the shroud rotates about the generally radial axis until all of the interference is taken up. By twisting the shroud, the airfoil acts as a torsional spring, which serves to maintain the contact load between adjacent shroud contact surfaces 32 at all normal operating conditions of the buckets.

To pre-twist the airfoil during assembly, a substantial tangential assembly force is required to generate the required twisting moment, i.e., torque on the shroud which occurs through the bearing forces on the shroud contact surfaces 32. The tangential assembly force must also overcome the frictional forces associated with sliding one contact surface 32 relative to the adjacent contact surface 32.

In the above referenced U.S. Pat. No. 5,590,784, there is provided shroud contact surfaces having a shallow angle, i.e., approximately 15° relative to the tangential axis creates a wedging effect as the buckets are tangentially assembled. Large bearing forces are thus generated on the shroud contact surfaces for the steep angle design illustrated in that patent and are oriented principally in the axial direction creating a substantial twisting moment on the shroud. The component of the assembly force in the tangential direction, however, is relatively small compared to the axial component of force which minimizes the required tangential assembly force necessary to overcome the tangential component of the shroud force and frictional forces.

A rhombic configured shroud, however, having a substantially larger tangential axis, i.e., on the order of about 40 to 60°, reduces the wedging action between the shroud contact surfaces as the buckets are driven tangentially causing the required tangential assembly force to be substantially greater than for the steep angle design of the prior patent. This places limitations on the size of bucket that can be adequately assembled.

Figure 3:
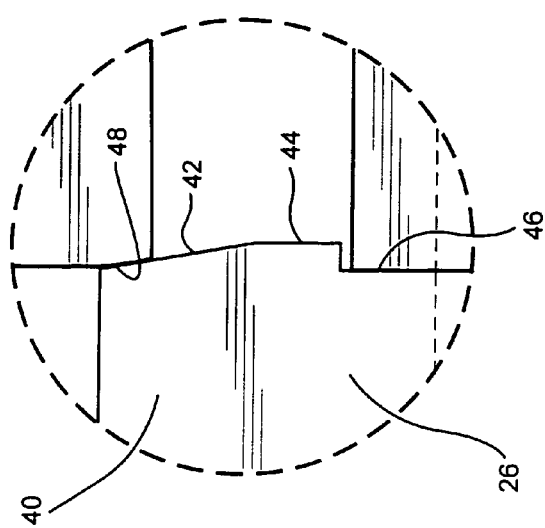
FIG. 3 is an enlarged fragmentary detail of a portion of FIG. 2.

In accordance with a preferred embodiment of the present invention, however, the very large interference contact surface angle is accommodated by application of the fixture 26 to the lug 24. Referring to FIGS. 2 and 3, each fixture 26 includes a portion 40 which projects in a tangential direction from the lug 24 to which the fixture 26 is attached. The projection 40 includes, on each axial downstream face, a leading chamfer 42, having an angle $\Theta$ of about 10° to the tangential axis and terminating in a flat 44 oriented at about 0° to the tangential axis, as illustrated in FIG. 3. The flat 44 leads to or terminates in a step 46 in the downstream face of the fixture 26. The size of step 46 is adjusted based on the interference level at the shroud contact surfaces 32. Additionally, as seen in FIG. 3, the axial admission face of the lugs 24 also include a chamfer 48 complementary to the chamfer 42, the chamfer 48 being located on an adjacent lug to the lug having a registering taper 42.

Figure 5:
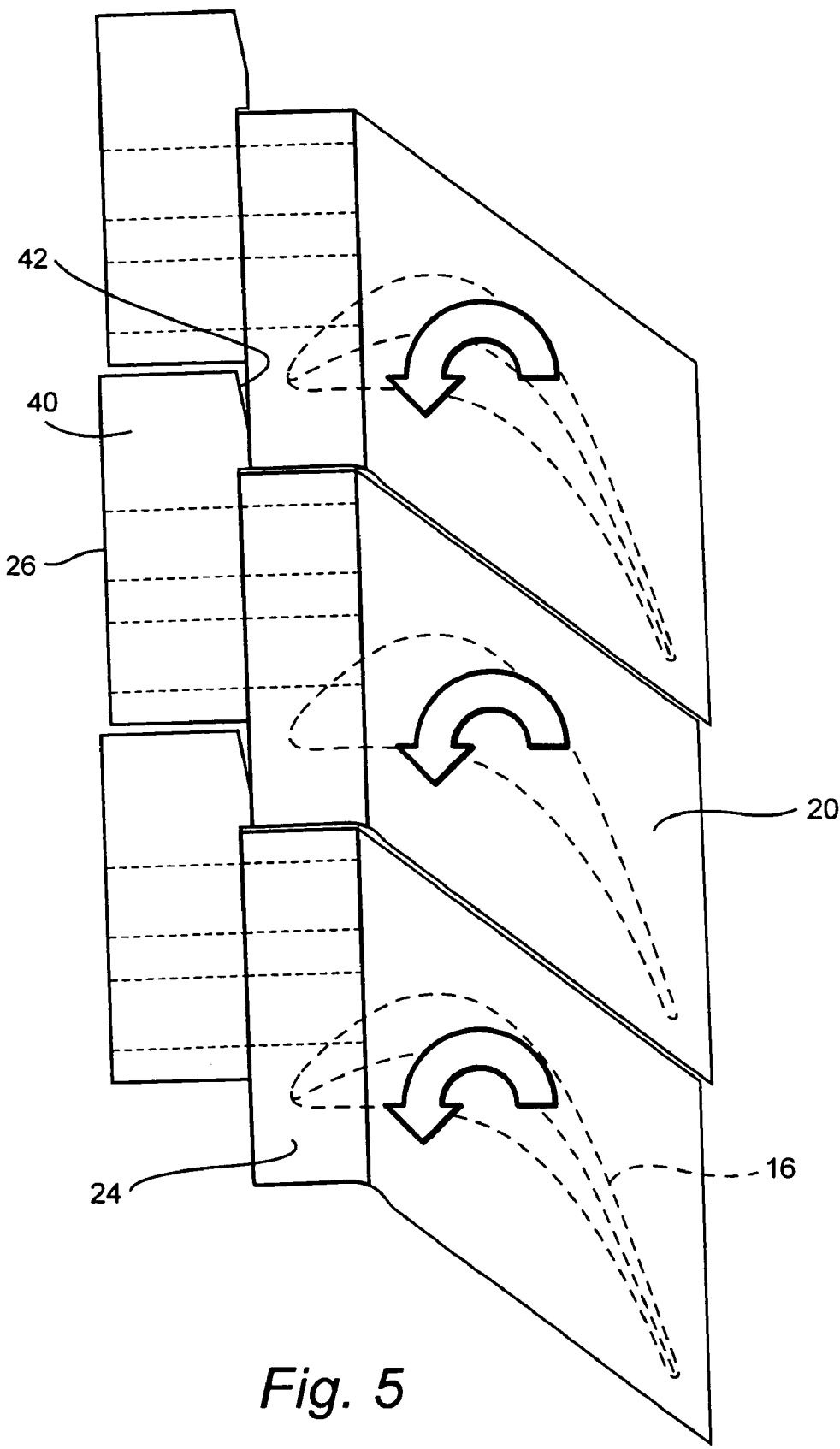
FIG. 5 is a view similar to FIG. 2 illustrating a direction of rotation or twist of the shroud and airfoils in the course of the assembly of the buckets on the rotor wheel.

To assemble the buckets on the rim of the rotor wheel, the fixtures 26 are secured to the lugs 24, e.g. using the bolts 28. Each successive bucket to be assembled is slid around the wheel rim to a location where the chamfer 42 contacts the mating chamfer 48 on the lug 24 of the preceding bucket. Once contact is made, a tangential assembly force is applied to the bucket being installed to drive the bucket toward the preceding bucket. The fixture 26 thus initially slides along the wedge angle created by the mating chamfers 42 and 48 causing a substantial twisting movement and corresponding rotation to occur at the shroud as illustrated in FIG. 5 as well as a twisting action of the airfoil 16. It will be appreciated that both of the mating buckets will twist with the application of a tangential assembly force. When the axial step between the faces of the two buckets equals the step size in the fixture, the flat surface 44 of the fixture contacts the flat axially forward face of the shroud lug. The magnitude of rotation at the shroud is governed by the fixture step size and is set to slightly exceed the level of rotation that would naturally be created by the interference condition at the shroud contact surfaces 32. Thus, as the shroud twists and because of the angle of the shroud edges 30, the tangential width of the cover as the shroud is rotated is taken up to the extent that the faces of the dovetail surfaces of the buckets contact one another. The step size is set, for example, so that approximately a 0.002 to 0.004 inch gap exists between the edges 30. This enables the adjacent buckets to slide together to enable the dovetail faces 34 to contact one another with only the involved frictional forces resisting motion of the buckets. Because of the small angle between the fixture 26 and lug 24, i.e., 10° chamfers and the contact between flat 44 and the adjacent lug, the frictional forces at such contact are larger than the forces tending to drive the buckets apart. The buckets will therefore remain in the partially assembled position after being driven together even when the assembly force is removed. This in turn enables additional buckets to be assembled and likewise driven together without interference from the previously assembled buckets.

When all of the buckets except for a closure bucket have been applied about the wheel, the closure bucket is inserted into a radial opening in the wheel dovetail and keyed or pinned to adjacent buckets. The assembly fixtures on the shrouds of the closure and adjacent buckets aid in assembly of the closure bucket since a pre-twist of the closure bucket shroud can be applied with the fixtures. Thus, the closure bucket is inserted and driven radially into the notch opening.

Figure 8:
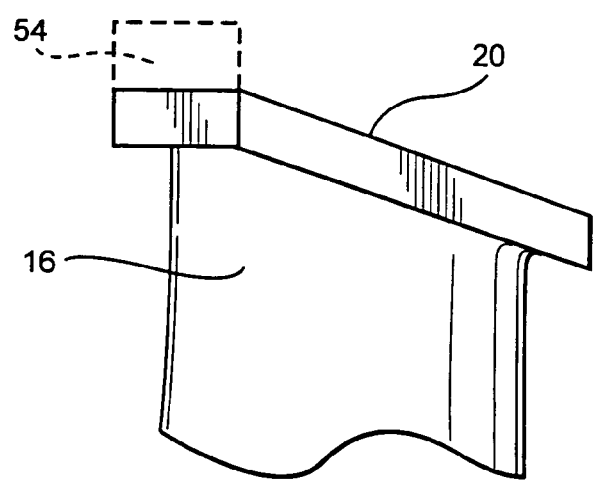
FIG. 8 is a fragmentary side elevational view of the shroud and airfoil of the bucket upon final securement.

After assembly of the closure bucket, the assembly fixtures 26 are removed from the shrouds. As the fixtures 26 are removed, a rotation of the shrouds occurs in the opposite direction from the initial pre-twist (i.e., compare FIGS. 5 and 6). This opposite or negative rotation of the shrouds enables the contact surfaces 32 of the shrouds to come into full flush contact with one another. That is, this counter rotation is provided by the bias of the airfoils 16 from the previously applied pre-twist. It will be appreciated that the dovetail anti-rotation key 22 is in place during assembly of the buckets to constrain dovetail rotation. Thus, the level of pre-twist in the bucket airfoil created by the shroud rotation biases the shroud for rotation in the opposite direction into final assembly. Outer portions 54 of the lugs 24 may then be removed, e.g., by machining, leaving the shrouds 20 including remaining portions of the lugs 24 in final position as illustrated in FIGS. 7 and 8.

Figure 6:
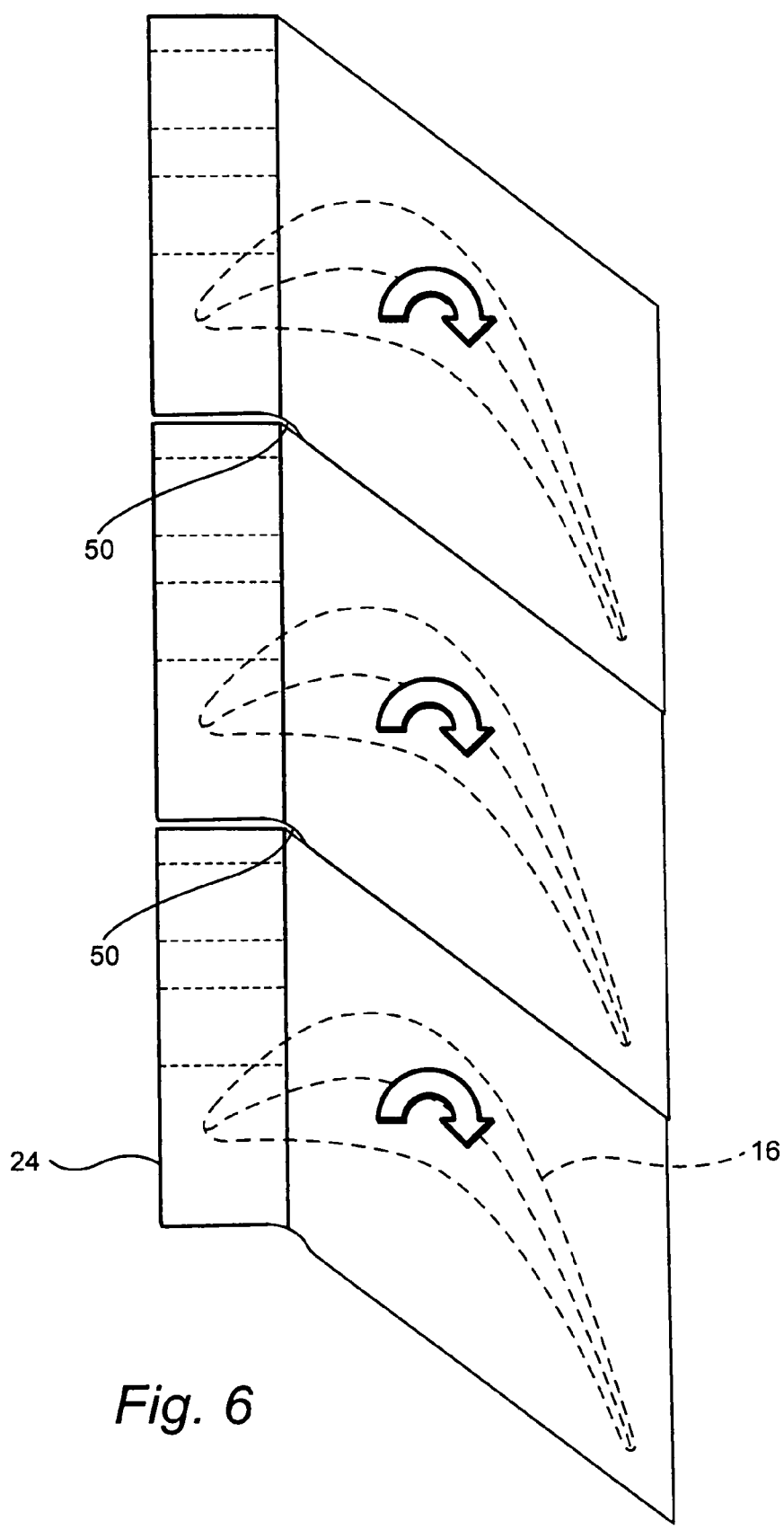
FIG. 6 is a view similar to FIG. 5 with the fixture removed illustrating a counter-rotation of the shroud and airfoil.

Referring to FIGS. 5-7, there is provided a relief groove 50 on the shroud pressure side surface. The relief groove 50 provides a low stress transition between the shroud contact and clearance surfaces. The relief groove 50 is also applied to reduce the potential for fretting fatigue by creating a separation between peak shroud bending and bearing stresses. It also creates a separation between the shroud contact and clearance surfaces such that final machine operations on the more critical shroud contact surface can be performed without impacting the finished clearance surface or corner fillet surfaces.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of assembling a plurality of buckets on a rotor wheel wherein each bucket includes an airfoil terminating at opposite ends in a shroud and a dovetail, respectively, comprising the step of pre-twisting the shroud and airfoil of each bucket in a rotational direction about a generally radial axis in response to applying a tangential assembly force to interference fit shroud contacting surfaces thereby imparting a rotational bias to the airfoil enabling subsequent rotation of the bucket into final assembly with the shroud edges of adjacent buckets in contact with one another and dovetail faces of adjacent buckets in contact with one another wherein pre-twisting of the shroud and airfoil of each bucket is carried out to a level of rotation exceeding the level of rotation created by the interference fit between adjacent shroud contact surfaces.

2. A method according to claim 1 including restraining rotational movement of the dovetail at the interface of the dovetail and rotor ring when said tangential assembly force is applied.

3. A method according to claim 1 including the step of wedging a fixture carried by the shroud of each bucket against a lug carried by the shroud of the adjacent bucket to pre-twist the bucket shroud and airfoils.

4. A method according to claim 1 including sliding each bucket being installed along the rotor rim to engage opposed contact faces of the dovetails as the shrouds and airfoils are being pre-twisted in excess of the level of rotation created by the interference fit between adjacent shroud contact surfaces.

5. A method according to claim 1 including rotating the shroud and airfoil of each bucket into said opposite rotational direction into final assembly.

6. A method of assembling a plurality of buckets on a rotor wheel wherein each bucket includes an airfoil terminating at opposite ends in a shroud and a dovetail, respectively, comprising the step of pre-twisting the shroud and airfoil of each bucket in a rotational direction about a generally radial axis in response to applying a tangential assembly force to interference fit shroud contacting surfaces thereby imparting a rotational bias to the airfoil enabling subsequent rotation of the bucket into final assembly with the shroud edges of adjacent buckets in contact with one another and dovetail faces of adjacent buckets in contact with one another, including providing a lug on the shroud of each bucket, releasably securing a fixture on each lug carried by the shroud of each bucket, the fixture and lug of respective adjacent buckets having generally complementary tapered surfaces at acute angles relative to the tangential direction, wedging the fixture carried by the shroud of each bucket being installed against the tapered surface of the lug carried by the shroud of the adjacent bucket previously installed on the rotor rim to pre-twist the shroud and airfoil of the bucket.

7. A method according to claim 6 including, for each bucket, removing the fixture from the lug to enable rotation of the shrouds and airfoil in the opposite rotational direction into final assembly.

8. A method according to claim 7 including removing a portion of the lug from each bucket after final assembly.

9. A method of assembling a plurality of buckets on a rotor wheel wherein each bucket includes an airfoil terminating at opposite ends in a shroud and a dovetail, respectively, comprising the steps of:

providing a lug on the shroud of each bucket;

releasably securing a fixture on each lug carried by the shroud of each bucket, the fixture and lug of respective adjacent buckets having generally complementary tapered surfaces at acute angles relative to the tangential direction; and wedging the fixture carried by the shroud of each bucket being installed against the tapered surface of the lug carried by the shroud of the adjacent bucket previously installed on the rotor rim to pre-twist the shroud and airfoil of the bucket.

10. A method according to claim 9 including, for each bucket, removing the fixture from the lug to enable rotation of the shrouds and airfoil in the opposite rotational direction into final assembly.

11. A method according to claim 10 including removing at least a portion of the lug from each bucket after final assembly.

12. A turbine wheel and bucket assembly comprising:
a plurality of buckets each including an airfoil, a shroud adjacent the tip of the airfoil and a dovetail adjacent a root of the airfoil;
a lug carried by each shroud;
a fixture releasably secured to each lug and having a projection extending in a tangential direction for overlying a portion of a lug of a previously assembled bucket onto the wheel, the adjacent shrouds having interference fit contacting surfaces;
at least one of the lug and the fixture projection having a tapered surface in contact with a surface of another of the lug and fixture projection to pre-twist the shroud and airfoil being installed.

13. An assembly according to claim 12 wherein said fixture includes said tapered surface, said lug having a second tapered surface, said tapered surfaces lying in engagement with one another to pre-twist the shroud and airfoil.

14. An assembly according to claim 12 wherein the tapered surface lies at an angle to a tangential direction of about 10°.

15. An assembly according to claim 13 wherein said lug has a flat adjacent said second tapered surface for engaging a surface of the lug of the previously assembled bucket for precluding the buckets from backing away from one another upon assembly.

16. An assembly according to claim 13 wherein each said lug has a clearance surface relative to an adjacent lug, each said interference fit contacting surface of each shroud and said clearance surface of each said lug having a relief groove there between.

* * * * *